United States Patent
Brookins

(10) Patent No.: US 12,500,947 B2
(45) Date of Patent: *Dec. 16, 2025

(54) GENERATION OF UNIQUE PRESENTATION OF MEDIA CONTENT

(71) Applicant: HULU, LLC, Santa Monica, CA (US)

(72) Inventor: Nicholas Brookins, Encinitas, CA (US)

(73) Assignee: HULU, LLC, Santa Monica, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 18/481,140

(22) Filed: Oct. 4, 2023

(65) Prior Publication Data
US 2024/0121284 A1    Apr. 11, 2024

Related U.S. Application Data

(63) Continuation of application No. 17/938,297, filed on Oct. 5, 2022, now Pat. No. 11,811,838.

(51) Int. Cl.
*H04L 65/60*     (2022.01)
*H04L 65/80*     (2022.01)

(52) U.S. Cl.
CPC .............. *H04L 65/60* (2013.01); *H04L 65/80* (2013.01)

(58) Field of Classification Search
CPC ......... H04N 21/25; H04L 65/60; H04L 65/80; H04L 65/75; H04L 65/612
See application file for complete search history.

(56) References Cited

U.S. PATENT DOCUMENTS

| 5,333,135 | A | 7/1994 | Wendorf |
| 8,880,633 | B2 | 11/2014 | Brookins et al. |
| 9,015,741 | B2 * | 4/2015 | Gordon ................ H04N 21/251 725/19 |
| 9,247,257 | B1 | 1/2016 | Wilkins |
| 9,426,543 | B1 * | 8/2016 | Li ...................... H04N 21/8586 |
| 9,553,954 | B1 | 1/2017 | Akhter et al. |

(Continued)

FOREIGN PATENT DOCUMENTS

CN   108650558 B * 1/2021 ........... H04N 21/251

OTHER PUBLICATIONS

U.S. Appl. No. 17/938,290, filed Oct. 5, 2022, William B. May, Jr.
(Continued)

*Primary Examiner* — Oanh Duong
(74) *Attorney, Agent, or Firm* — Kwan & Olynick LLP

(57) ABSTRACT

In some embodiments, a method determines an intent for requesting an instance of media content. A number of entropy slots is determined based on the intent for requesting the media content. An entropy slot in the media content is where a segment from a first version of the media content or a second version of the media content can be delivered. The method creates the second version of the media content having a first number of segments based on the number of entropy slots. The first number of segments in the second version of the media content based on the number of entropy slots is less than a second number of segments in the first version of the media content. The second version of the media content is output. The first version and the second version are used to create different sequences of segments that are attributable to different requests.

20 Claims, 10 Drawing Sheets

(56) References Cited

U.S. PATENT DOCUMENTS

| | | |
|---|---|---|
| 9,813,780 B2 | 11/2017 | Sarda et al. |
| 10,397,291 B1 | 8/2019 | Hall et al. |
| 11,284,139 B1 | 3/2022 | Cava |
| 11,451,863 B1 | 9/2022 | Benjamin et al. |
| 11,811,838 B1* | 11/2023 | Brookins ............... H04L 65/75 |
| 2003/0217121 A1 | 11/2003 | Willis |
| 2010/0070628 A1 | 3/2010 | Harrang et al. |
| 2011/0270929 A1 | 11/2011 | Harrang et al. |
| 2012/0128332 A1 | 5/2012 | Spitzlinger et al. |
| 2013/0054972 A1 | 2/2013 | Thorwirth |
| 2013/0142499 A1* | 6/2013 | Major ............... H04N 21/8456 386/341 |
| 2013/0212231 A1* | 8/2013 | Shi ................... H04N 21/23424 709/219 |
| 2014/0304373 A1 | 10/2014 | Tarbox et al. |
| 2015/0070516 A1 | 3/2015 | Shoemake et al. |
| 2016/0373821 A1 | 12/2016 | Nair et al. |
| 2017/0006318 A1 | 1/2017 | Jennings et al. |
| 2017/0208335 A1 | 7/2017 | Ramamurthy et al. |
| 2017/0289639 A1 | 10/2017 | Reisner |
| 2018/0184160 A1 | 6/2018 | Cain et al. |
| 2019/0166170 A1 | 5/2019 | Ramaswamy |
| 2019/0182494 A1 | 6/2019 | Li |
| 2019/0297392 A1* | 9/2019 | Farre Guiu .......... H04N 21/458 |
| 2019/0356711 A1 | 11/2019 | Choi |
| 2020/0236409 A1 | 7/2020 | Gordon |
| 2022/0078496 A1 | 3/2022 | Gordon |
| 2022/0414676 A1 | 12/2022 | Power et al. |
| 2023/0038275 A1 | 2/2023 | Fieldhouse et al. |
| 2024/0364980 A1* | 10/2024 | Linsey ............. H04N 21/47217 |

OTHER PUBLICATIONS

U.S. Appl. No. 17/938,290, filed Oct. 5, 2022, Inventor May, et al., Titled "Unique Playlist Creation Using Variable Substitution in Video Delivery" 42 pages.

U.S. Appl. No. 17/938,297, filed Oct. 5, 2022, Inventor Nicholas Brookins, Titled: "Generation of Unique Presentation of Media Content", 48 pages.

Pantos, R. Ed., HTTP Live Streaming 2nd Edition, 2021 IETF Trust; Retrieved from the Internet: https://datatracker.ietf.org/doc/html/draft-pantos-hls-rfc8216bis, 96 pages.

* cited by examiner

GENERATION OF UNIQUE PRESENTATION OF MEDIA CONTENT

CROSS REFERENCE TO RELATED APPLICATIONS

This application is a continuation application and, pursuant to 35 U.S.C. § 120, is entitled to and claims the benefit of earlier filed application U.S. application Ser. No. 17/938,297, filed Oct. 5, 2022, entitled "GENERATION OF UNIQUE PRESENTATION OF MEDIA CONTENT", the content of which is incorporated herein by reference in its entirety for all purposes.

BACKGROUND

When a content delivery network delivers a video to a client device, the client device may request segments of the video for delivery. The segments may be portions of the video (e.g., five second portions of the video). In the video delivery process, a content delivery network may provide a media playlist to a client device that includes links to the segments of the video. The client device may use each link to request a respective segment of the video. The request may retrieve a segment from the content delivery network for delivery to the client device.

In some scenarios, the content delivery network may provide a unique media playlist for a unique presentation of a video to a client. A fixed number of patterns can be used to generate unique presentations of the video. For example, the content delivery network may use two versions of the video, such as an A version and a B version. Typically, the entire video is copied from the A version to create the B version. The content delivery network may deliver different fixed patterns of segments from the two versions to create different unique presentations. The above method may not optimally use computing resources.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Figure 1:
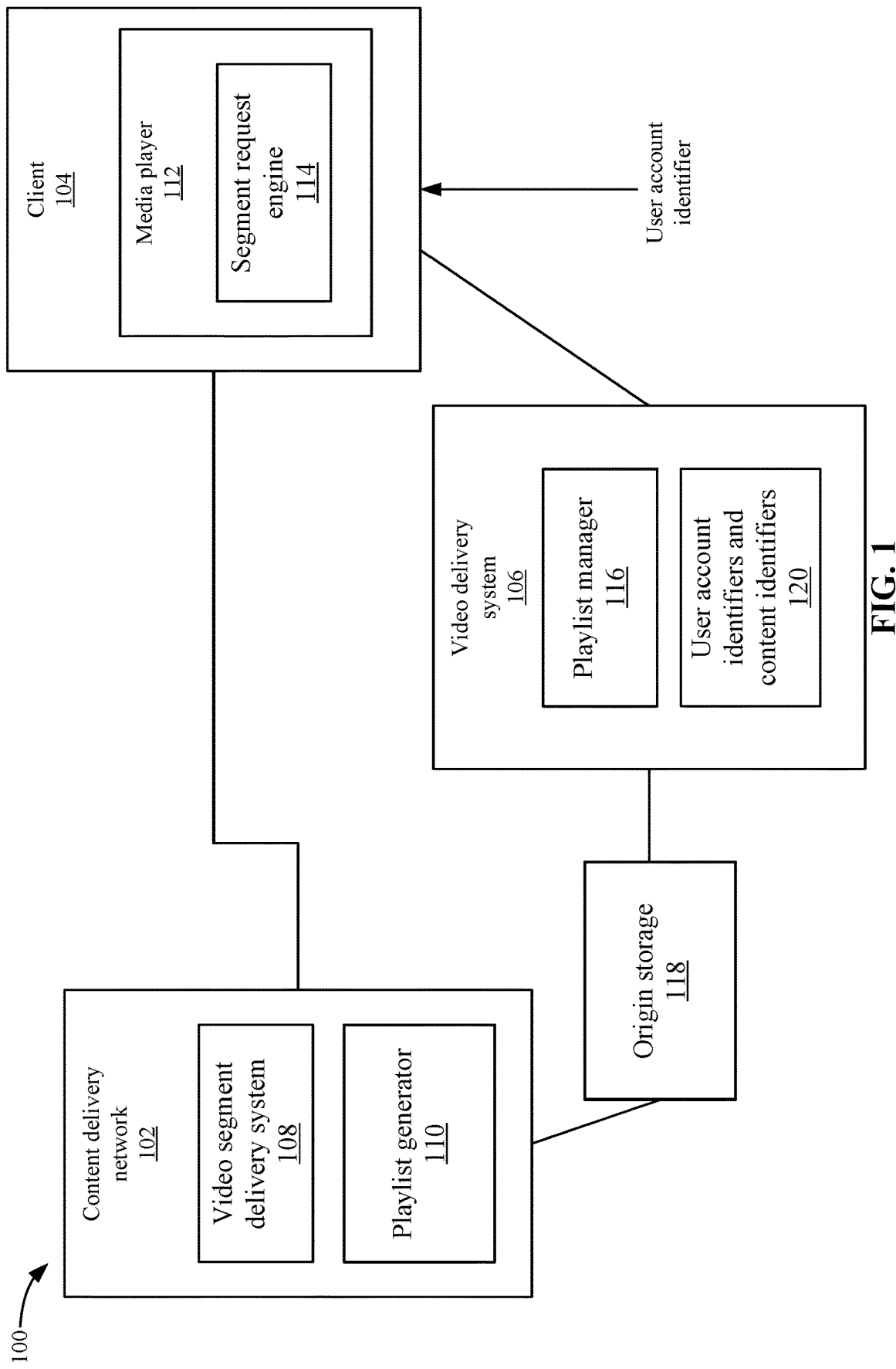
FIG. 1 depicts a simplified system for delivering a unique presentation of media content according to some embodiments.

Described herein are techniques for a content delivery system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

In some embodiments, a content provider may operate a video delivery system that causes delivery of a presentation of media content that is attributable to a request (for example, a request with specific characteristics such as originating from a particular source or region, a request associated with an individual requester, or an individual request). The presentation may be segments of content that form a unique presentation of the media content while preserving the same underlying content viewing experience for the user. The unique presentation may be based on a predictable mechanism that generates information (e.g., an identifier, binary string, etc.) that is used to reference and distinguish the unique presentation. The uniqueness of the media presentation may be that different presentations include different sequences of multiple versions of the media content. However, it may be possible that the predictable process generates the same version sequence of segments. The media content may be different information, such as video, audio, or other type of content that can be played on a media player or otherwise rendered via a computing device. To generate the unique presentations, the video delivery system may generate multiple versions, such as copies, of media content. The versions may be referred to as an A version and a B version, but more than two versions may be generated.

As discussed in the Background, in prior methods, a full version of the media content is copied to create the A version and the B version, which may not allocate computing resources efficiently. In some embodiments, a video delivery system may optimize the generation of unique presentations of media content. For example, the video delivery system may pre-calculate the number of potential unique presentations that may be required. Then, the video delivery system may allocate entropy slots in the media content that may introduce entropy in the presentations. For example, the number of unique presentations that can be supported may be 2^entropy slots. That is, ten entropy slots support $2^{10}$=1,024 unique presentations, twenty entropy slots support $2^{20}$=1,048,576 unique presentations, 30 entropy slots support $2^{30}$=1,0173,741,824 unique presentations, and so on. Slots may correspond to where segments of the media content can be delivered. Entropy in a slot is where one of multiple versions of the media content may be delivered in that slot. For example, if the media content includes an A version and a B version, the versions that are delivered in the entropy slots may be varied to create a unique presentation of the media content. Slots that are not designated to include entropy may not vary the version, such as the slot only plays a segment from one of the versions. Reducing the number of slots that are used to create entropy in unique presentations of media content may reduce the number of segments that need to be varied during playback of the media content. This may reduce the amount of computing resources that are used, such as reduce the computing resources that are used to encode the B version of media content if the A version is the primary/default version and reduce the storage to store the segments of the B version of media content. If 24 entropy slots are used, then an encoder may encode only 24 segments of the B version of the media content, rather than encode the entire B version, and not encode the other segments found in the A version in the B version. Also, only 24 segments may have to be stored for the B version. Also, the video delivery system may use a predictable mechanism (e.g., a hash algorithm) to determine which versions to deliver in the entropy slots. The determination may be same for each input, such as a given user account and content identifier.

Other optimizations may also be used. For example, the video delivery system may allocate the entropy slots in optimized areas of the media content, such as at the end of the media content. Placing the entropy slots at the end of the media content may allow for reduced video start-up time because the segments of the A version may be more likely to be in cache at a server in the content delivery network. For example, if the A version is delivered for the segments in the beginning of all presentations (e.g., unique and non-unique presentations), it is more likely that a segment has been delivered from the A version and will be found in cache at the server. That is, when a segment is delivered to a client, a server may retrieve the segment from the origin storage and then store the segment in cache for future delivery. Also, placing the entropy slots at the end of the media content may ensure that user accounts that join the playback of the media content mid-stream may also receive a unique presentation. If the entropy slots were included in the beginning of the media content, a user account that joined after those entropy slots have already been played would not receive a unique presentation. For example, if the last 50 slots always receive the A version, then playback starting anywhere in the last 50 slots would not result in receiving a unique presentation. Although placing entropy slots at the end is discussed, the entropy slots may be dispersed in any slots of the media content and the entropy slots may be in a contiguous portion of the media content or may be separated. The positioning of the slots may also be determined based on a characteristic of the content, such as positioned within the content based on an analysis of the content. Also, the video delivery system may dynamically determine the number of entropy slots based on characteristics of the media content. For example, metrics that may predict a number of required unique presentations for the media content may be used to determine the number of entropy slots that are required, such as only 10 entropy slots may be allocated if the number of unique presentations is lower for one instance of media content and 40 slots are allocated for a second instance of media content that is more popular and may require move unique presentations.

System Overview

FIG. 1 depicts a simplified system 100 for delivering a unique presentation of media content according to some embodiments. The media content may include different types of media content, such as video, audio, or other types of content information. Video may be used for discussion purposes, but other types of content may be appreciated.

System 100 includes a content delivery network (CDN) 102, a client 104, and a video delivery system 106. A content provider may operate a video delivery system 106 to provide a content delivery service that allows entities to request and receive media content. The content provider may use video delivery system 106 to coordinate the distribution of media content to clients 104. The media content may be different types of content, such as on-demand videos from a library of media content and live videos. In some embodiments, live media content may be based on a linear schedule where the media content is available based on the linear schedule. Media content may be received in other ways, such as media content that may be offered on-demand. On-demand media content may be content that can be requested at any time and not limited to viewing on a linear schedule. The media content may be programs, such as movies, shows, advertisements, etc. However, as discussed above, media content may be different types of content.

In some embodiments, the content provider provides media content that can be delivered using a protocol, such as HTTP Live Streaming (HLS). Although HLS is discussed, other protocols may be used, such as Dynamic Adaptive Streaming over HTTP (DASH) or another delivery method. A protocol may define information that is sent between a server and a client to have media content delivered. In the following description, terms, such as playlists, may be used; however, other terms may be used that may perform similar functions or send similar information. For example, DASH may use manifests to send links to segments of media content. As will be described in more detail below, the process may use a multi-variant playlist that references the variants for the media content. The variants may be different variations of the video, such as different bitrates or resolutions. Once a variant is selected, content delivery network 102 uses a media playlist that lists links to segments that a client 104 can request for playback. Accordingly, the multi-variant playlist may list the variants while the media playlist lists the segments that are available for the media content. Although the use of a multi-variant playlist and a media playlist is described, other methods of delivering the media content may be appreciated.

Content delivery network 102 may deliver the media content for the video delivery service. Content delivery network 102 may include one or more computing devices, such as servers, that deliver media content to client 104. A content provider may operate its own content delivery network, in addition to contracting with multiple third-party content delivery networks to assist in the delivery of its media content to clients 104. Although an instance of content delivery network 102 is shown and an instance of client 104 is shown, one or more instances of content delivery network 102 may be delivering media content to one or more instances of clients 104. Also, content delivery network 102 may include multiple computing devices, such as an origin server or servers that may store media content, and edge nodes, which may be geographically distributed. The edge nodes may receive segments of media content from the origin server and deliver the segments to different clients 104. Any server associated with content delivery network 102 may perform the functions described herein. Also, although video delivery system 106 and content delivery network 102 may be described, functions performed by either may be distributed between the two entities, or performed by other entities.

Content delivery network 102 may include a video segment delivery system 108 that delivers segments of media content to client 104. A segment of media content may be a portion of media content, such as around five seconds of video, and the media content may include multiple segments.

Client 104 may include different computing devices, such as smartphones, living room devices, televisions, set top boxes, tablet devices, etc. Client 104 includes a media player 112 that can play a video. In some embodiments, media player 112 receives segments of media content and can play these segments. A segment request engine 114 may send segment requests to content delivery network 102, and then receive the requested segments for playback in media player 112.

Video delivery system 106 may include storage 120 that stores identities, which may be used to define who sends a request for media content. The identities may include user account identifiers, client identifiers, or other identifiers. Video delivery system 106 may assign identities that identify a user account, such as user account identifiers that are associated with user accounts that use the video delivery service. The user accounts may be associated with users and the user account identifiers are used to access the video delivery service using client 104. The user account identifier may uniquely identify the user account among user accounts being used by video delivery system 106. Client 104 may receive a user account identifier when a user account uses the video delivery service. For example, when the user account logs into the service, the application is sent the user account identifier or has stored the user account identifier for the user account. Also, the identities may be associated with clients 104 that use the video delivery service, such as each client 104 may be assigned a unique client identifier (e.g., a network address, IP address, MAC address, etc.). Although user account identifiers and client identifiers are discussed, other types of identity information may be appreciated, such as media players may be assigned identities. Content identifiers may identify media content that can be sent to clients 104.

As will be discussed in more detail below, video delivery system 106 may use identity information, such as the user account identifier and a content identifier, to identify a sequence of segment versions that are sent for media content to client 104. Although the user account identifier and the content identifier are used, other information may be used, such as a combination of the user account identifier, client identifier, and content identifier.

In some examples of a general playback process, video delivery system 106 may provide a link to a first playlist to client 104. Client 104 may use the link to request the first playlist from content delivery network 102, and then client 104 receives the first playlist from content delivery network 102. The first playlist may be a multivariant playlist, that lists variants that are available for the media content. For example, a variant may include different characteristics, such as the variants may be encoded using different bandwidths, resolutions, encoders, etc. In some examples, the variants include multiple bitrates, such as 1000 Megabytes per second (Mbps), 1500 Mbps, etc. Client 104 may select a variant based on different conditions. For example, client 104 may request one of the variants based on the conditions being experienced during playback, such as available bandwidth. That is, client 104 may request a variant that was encoded at a lower bitrate if the available bandwidth is lower and a variant encoded at a higher bitrate if the available bandwidth being experienced during playback is higher.

Once client 104 selects a variant, client 104 requests a media playlist for the variant and receives the media playlist from content delivery network 102. The media playlist includes information that can be used to have segments delivered to client 104 to playback the media content on media player 112. The information may be links (e.g., Uniform Resource Locators) that identify the segments. In some embodiments, portions of the media playlist may be sent over time as the content is delivered and played back. For example, a first media playlist is sent with links to segments 1-3. Then, a second media playlist is sent with links to segments 4-6, etc.

To provide unique presentations, content delivery network 102 may store the different versions of the media content in origin storage 118. Content delivery network 102 may retrieve the segments from origin storage 118 when needed. The media content may include segments, such as 1000 segments that are around five seconds each. In some embodiments, an A version and a B version may be used. The A version may store the 1000 segments of the media content. Then, at least a portion of the segments of the media content may be selected as entropy slots in which corresponding segments could include a B version. Then, those segments are stored as another version, such as a B version. Multiple versions may each include the same (or similar) content of the video. The same content may be the same original content. Some variations may be introduced in different versions, such as different watermarks may be included in different versions. In some embodiments, video delivery system 106 may select which segments should be included in the B version. For example, 24 segments or another number of segments of the media content may be stored as the B version. That is, not all segments of the media content in the A version may be stored in the B version. Also, video delivery system 106 may select the position of the B segments from within the media content, such as the last 24 segments of the media content are selected, segments in the middle of the media content, random segments, etc. Also, in other embodiments, all segments may be replicated from the A version to the B version, but only a portion of the segments of the B version may be used to create unique presentations. When encoding different variants for media content, such as one for 1000 Mbps and one for 1500 Mbps, the segments for the B version of different variants may be encoded for each variant. However, in other embodiments, the segments encoded for one variant may be used for other variants. For example, the encoded segments for the B version for the 1000 Mbps may be used for other variants, such as the 1500 Mbps, or all other variants. Also, considering some variants have a large difference in bitrate, segments may be encoded for the B version at a portion of the bitrates and used for a group of variants. For example, variants less than 2000 Mbps use segments for the B version that are encoded at 1000 Mbps, and variants that are greater than 2000 Mbps use segments for the B version that are encoded at 3000 Mbps.

As will be discussed below, the 24 corresponding A version segments and B version segments may be varied in a media playlist that is sent to client 104 to create a unique presentation of media content. For example, if 24 entropy slots are being used, the segments that are delivered for the 24 slots to create a unique presentation may include a different sequence of versions. In some embodiments, the unique presentations may include the different sequence of A version and B version segments of "AAAAABAA-BAAAAABAAAAAABAB" and "AAAAABAA-BAAAAABAAAAAABB", respectively, within the unique presentations of the media content. In the last four segments, the difference between the first unique presentation and the second unique presentation is "ABAB" and "AABB" at the ends of the presentations. For example, in this situation, the full stream for the content may be in the format: "AAA ... AAAAAA ... AAAAABAABAAAAA-BAAAAAABAB" and "AAA ... AAAAAA ... AAAAA-BAABAAAAABAAAAAAABB" with the bold portion of the streams indicating the portion containing the unique segment sequence. In some embodiments, the unique segment sequence may be provided at either the beginning or the end of the content stream, or in between.

Playlist manager 116 may generate a unique playlist for a unique presentation of media content. As will be discussed in more detail below, playlist manager 116 may determine the sequence of segments from the A version and the B version based on input that may be unique to the request for the media content. For example, the input may be a user account identifier and a content identifier for the media content that has been requested. However, other inputs may be used, such as a client identifier for client 104. The content identifier and the user account identifier may be translated into a unique request identifier (ID), such as using a predictable algorithm (e.g., a hash algorithm) that outputs the same output for the same input. The unique request ID may be associated with a unique sequence of versions for the entropy slots. For example, a hash of the content identifier and the user account identifier may yield a hash code, which may be a series of values, such as "0" and "1" values. For example, the unique request ID may be "0101 ... 01". Each value may correspond to a segment in the media content and represent which version is associated with the segment. For example, the first value of "0" may indicate segment 100 is associated with version A, the second value of "1" indicates segment 101 is associated with version B, etc. The values may equal the number of entropy slots that contain the unique sequence of segments. Padding or truncating of the hash may be performed to make the unique request ID equal to the number of entropy slots in the media playlist that could be from either the A version or the B version. Also, the unique request ID may be generated in other formats that could specify which version a segment should be assigned. Slots other than the entropy slots may be assigned a fixed version, such as the A version. While the unique request ID may be associated with the entropy slots, a larger ID for the media content may be used. However, the slots outside of the entropy slots would be fixed to the same version for multiple unique presentations, such as slots 1-130 always receive a segment from version A.

Playlist manager 116 may generate a sequence of segments from the A version and the B version based on the unique request ID. For instance, a 0 value may correspond to the A version, and a 1 value may correspond to a B version. Accordingly, when one of the segments that should be uniquely presented to client 104 is encountered, a corresponding value in the unique identifier is used to determine which segment should be provided to client 104. For example, if a portion of the unique identifier is "0101", then the portion of the entropy slots have the first segment from the A version, the second segment from the B version, the third segment from the A version, and the fourth segment from the B version. Although the above method of generating the unique request ID is discussed, other methods may be used, such as using pre-generated unique request IDs that are assigned per request.

After generating the values of the variables, playlist manager 116 may send the values to the client device using one or more of a number of different methods described herein. For example, video delivery system 106 may receive a request for media content. Then, playlist manager 116 may determine whether a unique presentation is desired. If the unique presentation is desired, playlist manager 116 may send the sequence of which versions to use for which segments to client 104 or content delivery network 102. For example, the unique request ID may represent the sequence and can be communicated to client 104 or content delivery network 102.

In some embodiments, playlist manager 116 may send the unique request ID in a link for a multivariant playlist to client 104. Client 104 uses the link to request the multivariant playlist from content delivery network 102. Content delivery network 102 may use the unique request ID to determine the sequence of segments for the unique presentation. Further details may be described in U.S. application Ser. No. 17/938,290 entitled "UNIQUE PLAYLIST CREATION USING VARIABLE SUBSTITUTION IN VIDEO DELIVERY", the content of which is incorporated by reference in its entirety. Although the above process is described, other processes may be used. For example, client 104 or content delivery network 102 may generate the unique request ID. Also, content delivery network 102 may send the unique request ID to client 104 instead of playlist manager 116 sending the unique request ID to client 104.

If a unique presentation is not desired, then content delivery network 102 may send a non-unique sequence of segments, such as only segments from one version of the media content (e.g., the A version). However, the non-unique sequence may include a fixed sequence of segments from the A version and the B version. Video delivery system 106 does not need to communicate a unique request ID to client 104 or content delivery network 102 in this case.

As discussed above, the generation of unique presentations of media content may be optimized in different ways. For example, video delivery system 106 may determine an upper bound for segments in the B version. The upper bound may limit the number of segments that is used to create a unique presentation, such as to around 24 segments. Also, video delivery system 106 may place the slots that are used to create the entropy in the unique presentations in optimal positions. For example, video delivery system 106 may place the slots later in a presentation. Also, video delivery system 106 may dynamically determine the number of segments that are used to create unique presentations. Other advantages may also be appreciated.

The following will now describe the delivery of the unique presentation of media content in more detail starting with the version creation process and then the playback process.

Version Creation

Figure 2:
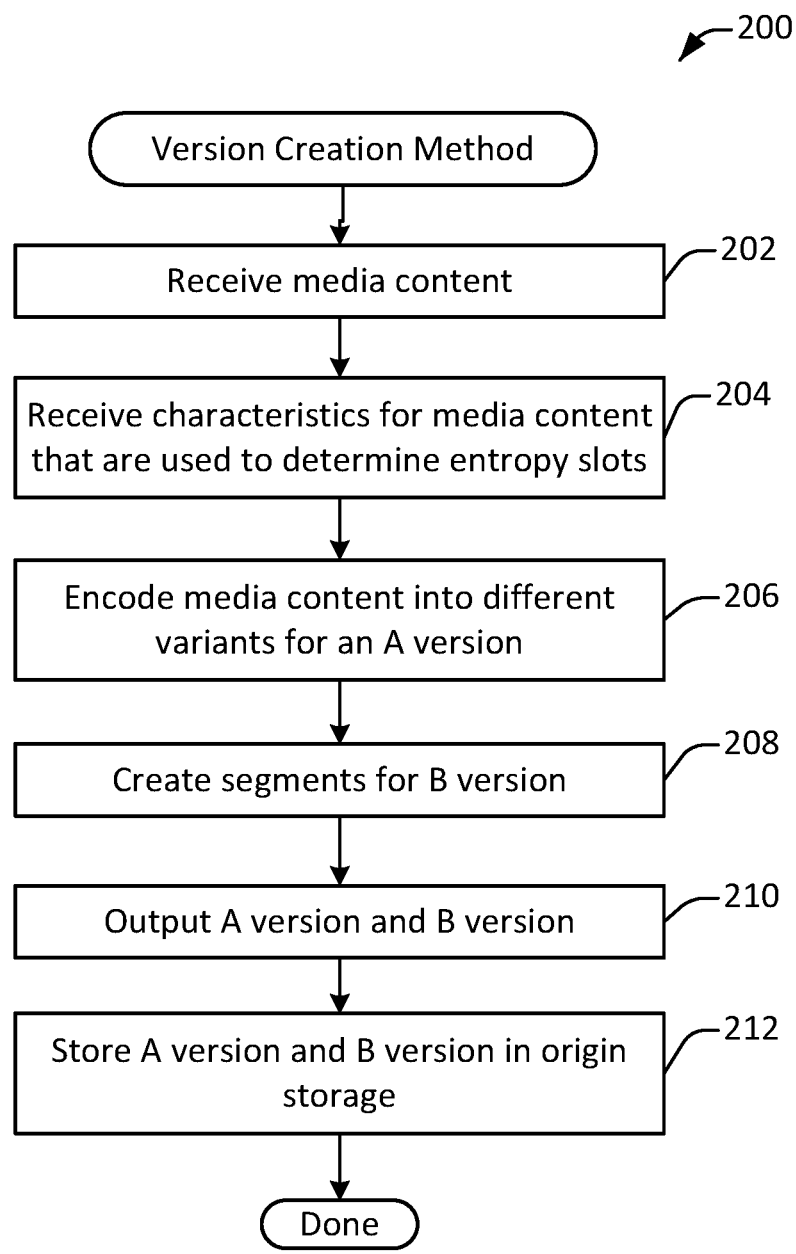
FIG. 2 depicts a simplified flowchart of a method for creating versions of media content according to some embodiments.

FIG. 2 depicts a simplified flowchart 200 of a method for creating versions of media content according to some embodiments. At 202, video delivery system 106 receives media content. The media content may be received using different ways. For example, a signal may be received that includes the media content. The signal may be based on a presentation of the media content, such as live media content may be presented, and the signal is received from the broadcast of the live media content.

At 204, video delivery system 106 receives characteristics for media content that are used to determine entropy slots. The entropy slots may not be included in all the segments of the A version. For example, only a portion of segments in the media content may be designated as entropy slots. In some embodiments, video delivery system 106 determines a boundary, such as an upper bound, in the number of B segments that may be required. The upper bound may be based on how many combinations of unique presentations may be needed for the media content. That is, the number of entropy slots may be determined such that all requests in which unique presentations are desired may be met. For example, if it is determined that 15,000,000 unique combinations may be needed, then video delivery system 106 may use 24 entropy slots, which may allow for 16,777,216 unique combinations. The upper bound may be determined based on different information. For example, a prediction that media content may be more popular may cause a higher upper bound to be assigned and media content that may be less popular may be assigned a lower upper bound. The use of the upper bound may reduce the amount of encoding resources that are used and reduce the storage used to store these segments because less segments for the B version may be encoded and stored. Also, as will be discussed in more detail below in FIG. 8, the entropy slots may be dynamically assigned for different media content to reduce the number of slots that are used. For example, using metrics associated with an instance of media content, video delivery system 106 may vary the number of entropy slots, such as reduce the number of entropy slots if it is predicted that less unique presentations may be needed.

Another optimization may be the entropy slot placement. The placement of entropy slots in the media content may be performed in conjunction with determining the number of entropy slots. For example, the number of entropy slots may be determined above based on a characteristic of the media content. Also, in other embodiments, the placement may not require the determination of the number of entropy slots based on a characteristic of the media content. Rather, the number of entropy slots may be predetermined, a standardized number, or a number that is associated with a largest number of unique presentations that may be required. For the positioning, as discussed above, the use of the A version of segments at the beginning of the media content may improve the streaming experience, such as the probability of finding a segment from the A version in cache. Also, positioning the entropy slots at the end of the media content may ensure that there is some entropy to create a unique presentation even when the playback of media content starts at a later time, such as in the middle of the media content. Also, the optimizations may omit creating some segments of the B version that are not required. For example, the coding of segments of the B version that would not be associated with an entropy slot may not be required.

At 206, video delivery system 106 encodes the media content into multiple variants for an A version of the media content. A variant may be a version with different encoding characteristics. For example, variants may be encoded using different bitrates, resolutions, encoder types, etc. In some examples, the variants are associated with different bitrates, such as 1000 megabytes per second (Mbps), 1500 Mbps, etc. The encoder may encode the media content into each variant.

At 208, video delivery system 106 creates segments for the B version of media content. Different methods for creating the B version may be appreciated. As will be discussed in more detail below, the segments that are encoded for the B version may not include all the segments for the A version. For example, the encoder may receive a specification of which segments should be encoded for the B version, such as the last 24 segments of the media content. Then, the encoder may encode the media content into the B version for the last 24 segments. Also, a copy of the A segments may be created instead of encoding the segments for the B version. The B version of the segments may include the same or similar content as corresponding segments in the A version. In some examples, additional content may be added to the B version, such as a digital watermark or other information, such as a marker, symbol, etc. The B-version of the segments may be created in such a way that it is transparent to a viewer of the requested content whether an A segment or a B segment is being played out by the media player 112. Also, the B version may be named differently. For example, the file name or directory path may be different for the B version segments. An example of the stored segments for the A version and the B version will be described in FIG. 3.

At 210, video delivery system 106 outputs the A version of the media content and the B version of the media content. Then, at 212, video delivery system 106 may store the A version of media content and the B version of media content in origin storage 118. As discussed above, the B version of the media content may not include all the segments from the A version, which may save storage space on origin storage 118.

Figure 3:
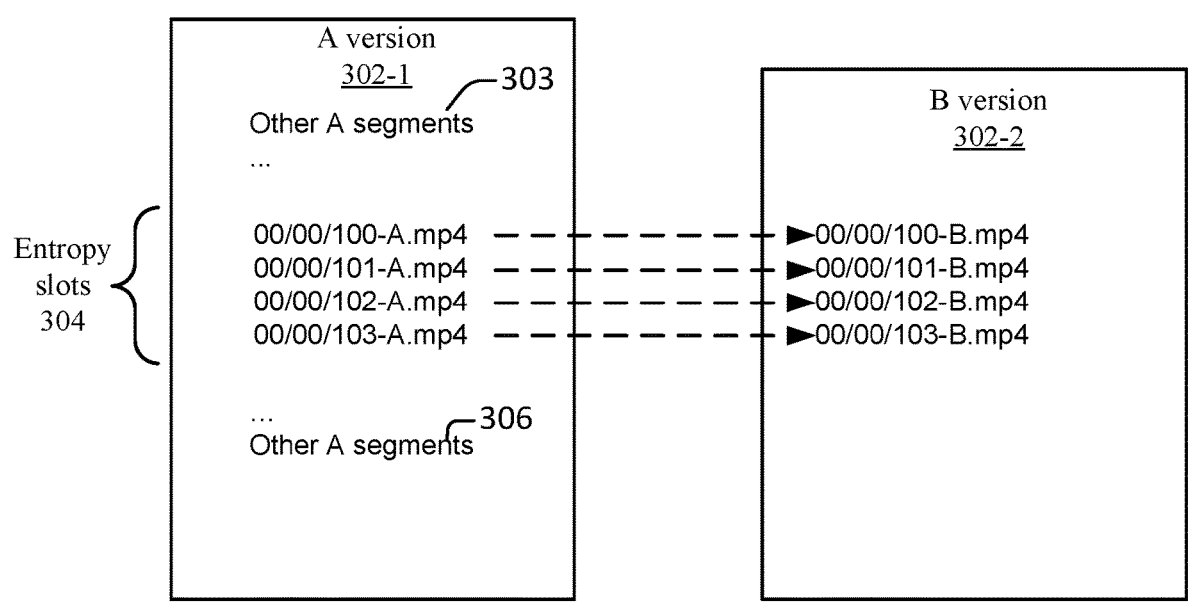
FIG. 3 depicts an example of an A version and a B version of the media content according to some embodiments.

FIG. 3 depicts an example of an A version 302-1 and a B version 302-2 according to some embodiments. At 303 and 306, other A segments are stored in A version 302-1. The other A segments are not in entropy slots in that these segments are always sent when the media content is requested. Entropy slots 304 are where a set of segments may be selected from the A version or the B version to generate a unique presentation for the media content. As shown, four entropy slots 304 are provided, but there may be other amounts of entropy slots, such as 24 entropy slots. Further, the entropy slots may be contiguous as shown or may be distributed throughout the content.

To create B version segments, video delivery system 106 may create a copy of the segments in the A version that correspond to entropy slots 304. Then, video delivery system 106 may change information for the segment, such as the file name, path name, or link for the segment, to be different than information for the A version. In this example, an extension of "-B" is added to the end of the file name, but other methods may be used to distinguish the segments in the B version from the A version, such as adding an "-A" to the segments in A version 302-1 that are found in entropy slots 304. For example, an A version of a segment is stored at the path name of 00/00/100-A.mp4, and the B version of the segment may be stored at the path name of "00/00/100-B.mp4". Similarly, the file name of other segments is changed from "-A" to include the extension of "-B" at the end of the file name. Other methods may also be used to create segments for the B version, such as having unique directory paths for the A version and the B version.

The B version of the media content does not include segments corresponding to the other segments that are found in the A version at 303 and 306. That is, the only segments included in the B version are corresponding B version segments for entropy slots 304. This reduces the amount of storage that is used for the B version compared to storing B version segments corresponding to all of the A segments in the B version. However, all the segments of the A version of the media content could be copied to the B version, but only a portion of the segments for the B version may be used for entropy slots 304.

After encoding the A version of media content and the B version of media content, playback may be performed. The following will describe a playback process that may deliver unique presentations of the media content and also non-unique presentations of the media content.

Playback

Figure 4:
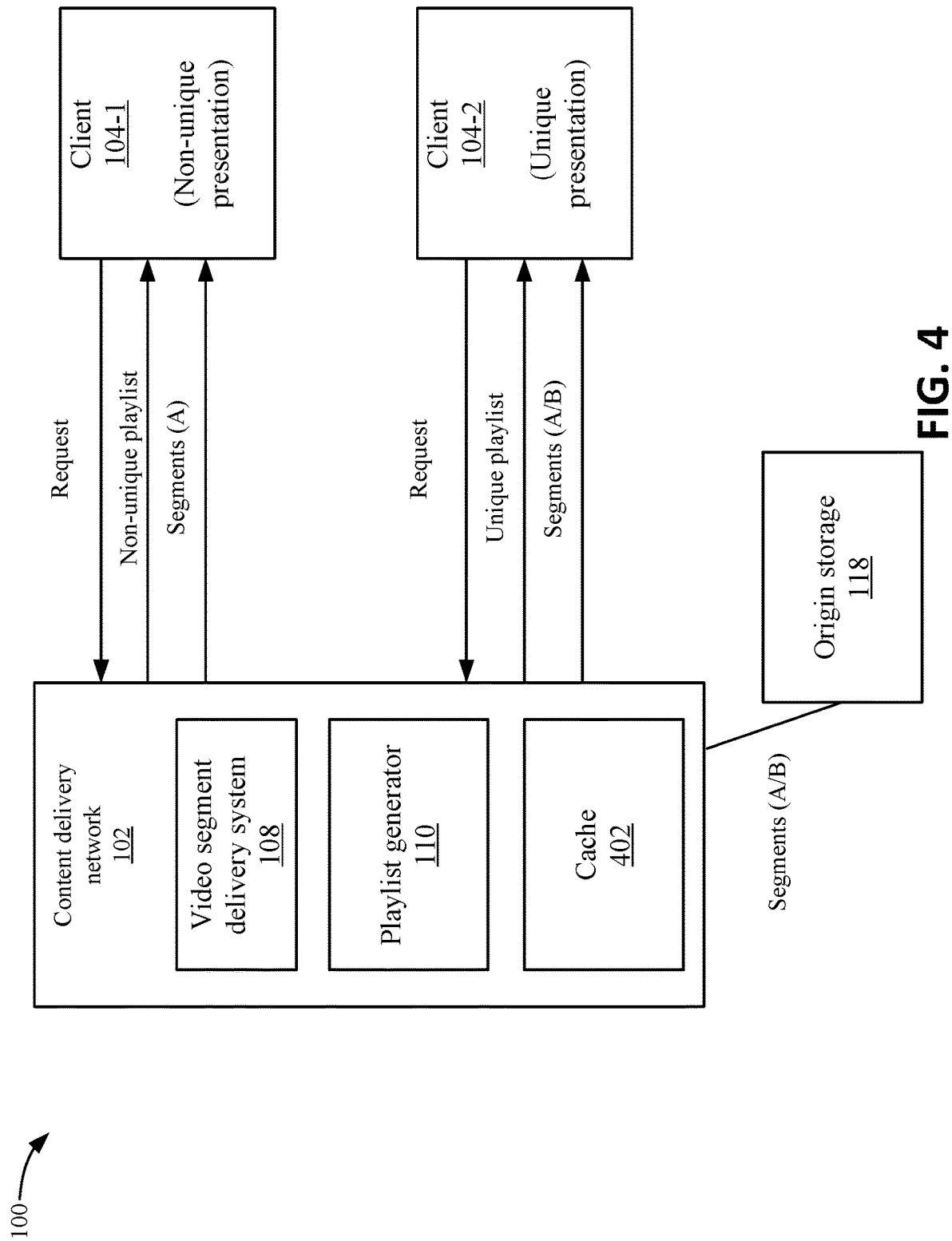
FIG. 4 depicts an example of the playback process according to some embodiments.

FIG. 4 depicts an example of the playback process according to some embodiments. For a request, a unique presentation or a non-unique presentation may be provided. Accordingly, when a request is received, video delivery system 106 may determine when it is desired to provide a unique presentation of media content. There may be multiple different scenarios in which it may be useful to respond to a request for media content by client 104 with a copy of the content that is unique to the client or to the request. In some content request scenarios, a unique presentation of the media content may not be required. That is, in some of the scenarios, a unique presentation of the media content may be provided, and in other scenarios, a non-unique copy may be provided. For example, in scenarios where copy protection/anti-piracy/confidential disclosure is a concern, providing a unique copy is useful to track any subsequent unauthorized distribution and trace it back to the original requester (e.g., a user account or client 104). In this scenario, the unique copy functions as a "digital watermark" for purposes of identifying duplicates of the unique version. In addition to the unique version of the requested content itself serving as a digital watermark, further digital watermark data may be embedded on segments that are sent to client 104 to create a further way to uniquely identify the media content that is received by client 104. In other scenarios, it may be useful to provide a unique version of the requested content in response to a request by client 104 to stream a piece of content that a user previously designated to be saved or recorded from a broadcast of the underlying content on a linear network or similar broadcast. A linear network is a broadcast network such as an over-the-air, cable, or satellite broadcast of scheduled programming. In addition to the foregoing scenarios, the method may be used for any other scenario in which a unique copy is desirable to be provided in response to a client request for content.

In the example shown in FIG. 4, client 104-1 may require a non-unique presentation and client 104-2 may require a unique presentation. Content delivery network 102 may deliver the media content differently to client 104-1 and client 104-2. In some embodiments, content delivery network 102 may receive a request for media content from client 104-1. In this case, client 104-1 receives a non-unique presentation. Content delivery network 102 may determine whether the non-unique presentation should be provided using one of different methods. For example, video delivery system 106 may have determined that a non-unique presentation should be provided for this request. Then, when the non-unique presentation is desired, video delivery system 106 may not include a unique request ID in the request, which indicates to content delivery network 102 that a non-unique presentation should be used. However, other methods may be used to indicated to content delivery network 102 that a unique presentation is required or not. For example, upon receiving a request, content delivery network 102 may communicate with video delivery system 106 to determine whether a unique presentation of media content is desired. Also, content delivery network 102 may independently determine that a non-unique presentation is desired without communicating with video delivery system 106.

In some embodiments, the request that is received from client 104-1 may be a request for a multi-variant playlist. Content delivery network 102 may send the multi-variant playlist, and client 104-1 may select a variant and request a media playlist for the variant. In some embodiments, when a non-unique presentation is required, content delivery network 102 uses a non-unique media playlist that is provided to multiple clients 104. The non-unique playlist includes information to request segments in a non-unique sequence, such as all segments from the A version of media content. In this case, client 104-1 may send requests for the segments of media content from the A version (and only the A version). Then, content delivery network 102 provides the segments from the A version to client 104-1 in response to the requests.

Content delivery network 102 may maintain a cache 402, which may be storage that is used to store segments that have been delivered to clients 104. When delivering segments from the A version, content delivery network 102 may retrieve segments from origin storage 118. Then, content delivery network 102 may store the segments from the A version when they are delivered to client 104-1. When the same segments are requested by another client 104, content delivery network 102 may use the segments stored in cache 402 instead of retrieving the segments from origin storage 118. Using cache 402 may save computing resources that are needed to communicate with origin storage 118 to retrieve segments.

In another example, client 104-2 may send a request for the same media content. In this case, video delivery system 106 determines that client 104-2 requires a unique presentation. Then, playlist generator 110 generates a media playlist that includes a unique presentation of segments. The sequence of segments for the unique presentation may be generated in different ways. In some embodiments, the pattern may be generated in real-time when a request is received. However, the pattern may also be pre-generated. As will be discussed in more detail below, playlist manager 116 may determine the sequence of segments from the A version and the B version based on input that may be unique to the request for the media content, such as using the unique request ID. Then, the unique request ID may be included in a link to the multi-variant playlist, and video delivery system 106 provides the link to client 104-2. Client 104-2 then uses the link to request the multi-variant playlist from content delivery network 102. Because the link includes the unique request ID, content delivery network 102 determines that a unique presentation is desired and can use the unique request ID to determine the unique sequence of segments from the versions. Once the determination of which segments should be used is made, playlist generator 110 generates a media playlist that includes information for segments from the A version of media content or the B version of media content. In some embodiments, segments from the A version of media content are used for segments that are not included in the defined entropy slots of the media content. However, when the entropy slots are encountered for the media content, playlist generator 110 may select one of the A version of media content or the B version of media content to include in the media playlist based on the unique request ID.

After generating the media playlist, client 104-2 may request the unique media playlist from content delivery network 102. The process proceeds where client 104-2 uses the information in the media playlist to request segments of the media content. The operation of client 104-1 and client 104-2 to request segments may be similar in that client 104-1 and client 104-2 use the information in the media playlist to request the segment. That is, the functionality of requesting segments for client 104-2 does not change when requesting a non-unique presentation or unique presentation. The links in the media playlist may change, but client 104-2 uses the same logic to request the segments using the links. Once requesting the segments, content delivery network 102 may send the requested segments to client 104-2. That is, when a segment from the A version is requested, content delivery network 102 may deliver the segment from the A version. Then, when a segment from the B version of media content is requested, content delivery network 102 sends the segment from the B version. In some embodiments, variable substitution may be used where variables are included in links that are sent in the media playlist to multiple clients 104. Then, the values for the variables may be sent to clients 104. Different clients 104 may receive different values for the variables to form unique presentations. Each client 104 may insert the values that correspond to variables in the links to form the request for the segment. Further details may be described in U.S. application Ser. No. 17/938,290, entitled "UNIQUE PLAYLIST CREATION USING VARIABLE SUBSTITUTION IN VIDEO DELIVERY", the content of which is incorporated by reference in its entirety.

As discussed above, when a request is received, content delivery network 102 may first look in cache 402 to determine if the requested segment is stored in cache 402. If not, content delivery network 102 may retrieve the segment from origin storage 118. It may be more likely that the A version of segments may have been delivered previously, such as in a non-unique playlist, which may result in the segments from the A version being stored in cache 402. Then, when a segment from the B version is first requested at content delivery network 102 (e.g., at a server), content delivery network 102 may retrieve the segment from the B version from origin storage 118 and store that segment in cache 402. Later, if another client 104 is assigned the same segment from the B version, then the server may use the segment from the B version that is stored in cache 402.

One optimization that results from designating the last 24 slots of media content as being entropy slots is that it may be more likely that a segment is found in cache 402 when playing back the media content. For example, if the number of initial segments is specified to be from the A version, then it is more likely that the first X segments of the A version may be stored in cache 402. This provides an improved cache-hit ratio, reduces the communication with origin storage 118, and also may reduce other metrics, such as video start failure (VSF), video start time (VST), and connection-induced rebuffering ratio (CIRR). The video start failure may be when the start of a video fails; the video start time may be time that the video takes to start; and the connection-induced rebuffering ratio is how many re-buffers result. By having the segments stored in cache 402, these metrics may be reduced because the amount of time to retrieve the segment is reduced when retrieving the segment from cache 402 compared to retrieving the segment from origin storage 118.

Figure 5:
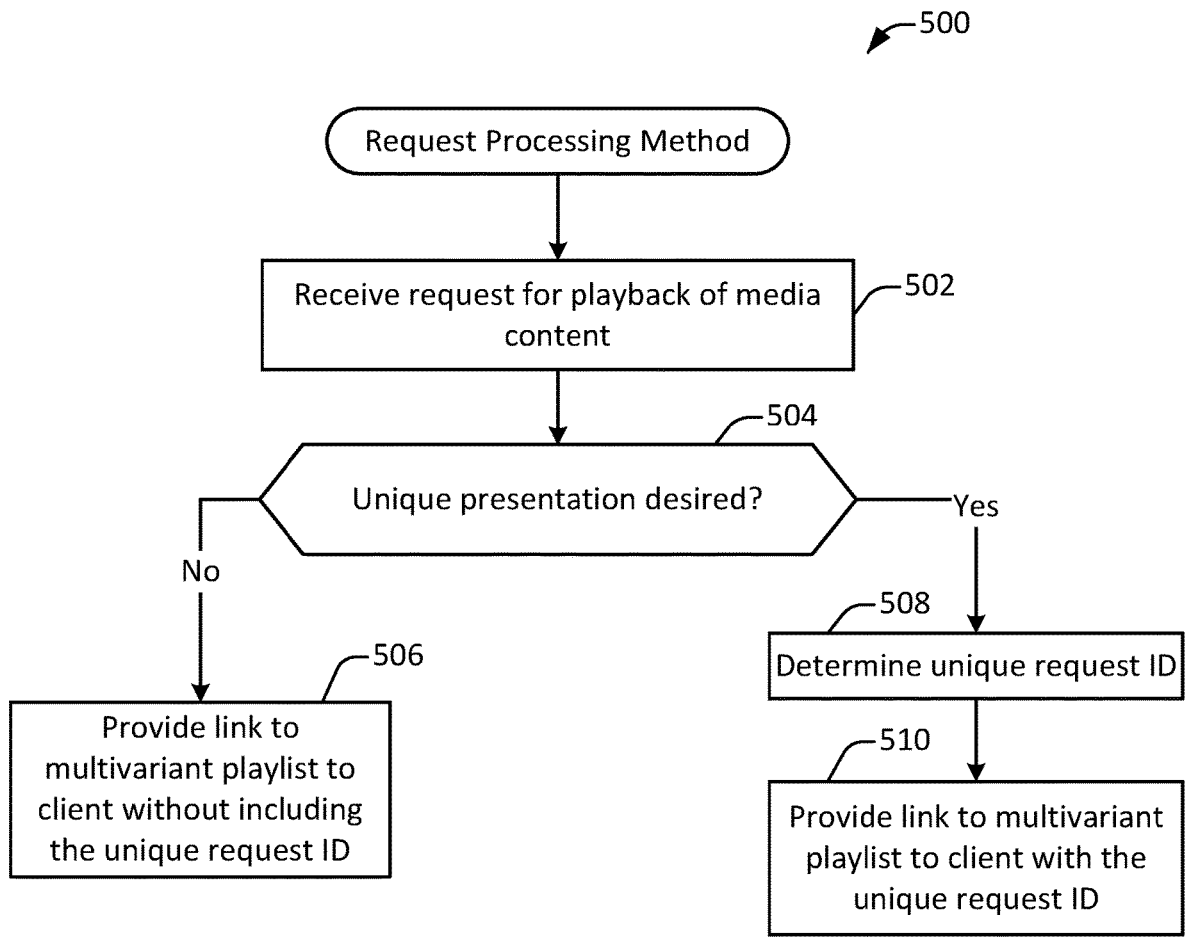
FIG. 5 depicts a simplified flowchart of determining when a unique presentation is desired according to some embodiments.

As discussed above, not all presentations of the media content may be unique. FIG. 5 depicts a simplified flowchart 500 of determining when a unique presentation is desired according to some embodiments. At 502, video delivery system 106 receives a request for playback of media content. This may be an initial request for playback of media content. At 504, video delivery system 106 determines if a unique presentation is desired. Video delivery system 106 may analyze different scenarios from which the request may be received. As discussed above, some scenarios may require a unique presentation and some scenarios may not. For example, video delivery system 106 may determine whether the request is for a playback of recorded media content in a DVR.

If a unique presentation is not desired, at 506, video delivery system 106 provides a link to a multi-variant playlist to client 104 without creating a unique request ID. This link to a multi-variant playlist may be used for non-unique presentations.

If a unique presentation is desired, at 508, video delivery system 106 determines a unique request ID. For example, the unique request ID may be "010000010011000101001110", where each "0" value represents the A version and each "1" value represents the B version. Each value may also correspond to an entropy slot. At 510, video delivery system 106 provides the link to the multi-variant playlist to client 104 where the multi-variant playlist includes the unique content ID.

Playback Process

Figure 6:
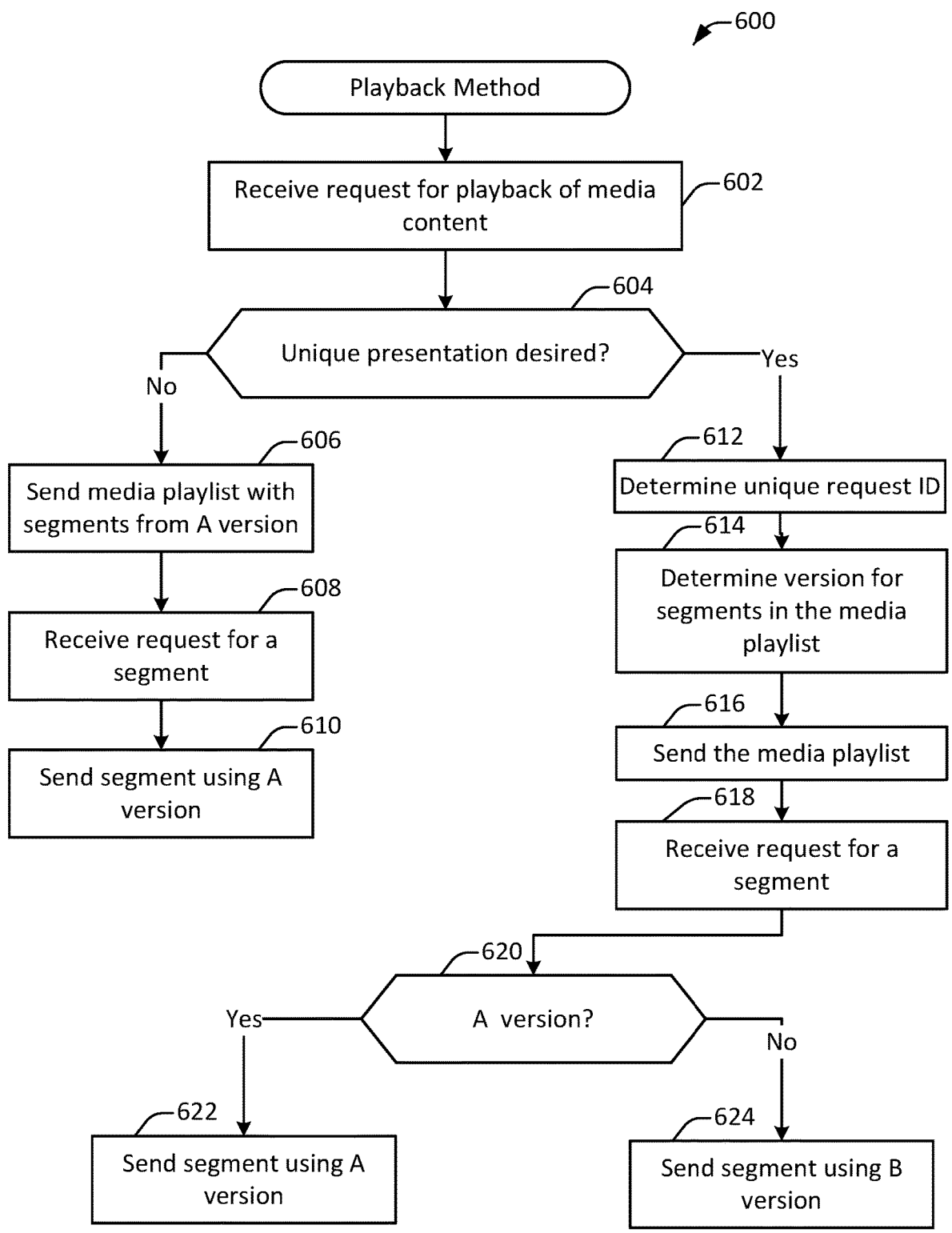
FIG. 6 depicts a simplified flowchart of a playback process that is performed at a content delivery network according to some embodiments.

FIG. 6 depicts a simplified flowchart 600 of a playback process that is performed at content delivery network 102 according to some embodiments. At 602, content delivery network 102 receives a request for playback of media content. In some embodiments, this process assumes that client 104 has selected a variant from available variants and is requesting the playback of that variant.

At 604, content delivery network 102 determines if a unique presentation is desired. As discussed above, content delivery network 102 may determine whether a unique presentation is desired in different ways. If a unique presentation is not desired, at 606, content delivery network 102 sends a non-unique media playlist, such as a media playlist for segments from the A version. Although not described, content delivery network 102 may send multiple media playlists that include portions of the segments of the media content. As playback continues, content delivery network 102 sends updates that include new segments to request. After sending the media playlist, at 608, content delivery network 102 receives a request for a segment. Different methods may be used to request a segment using the link, such as using an HTTP GET request that uses information from the link to identify the segment that is being requested. Then, at 610, content delivery network 102 sends a segment using the A version. This process continues from 606 to 610 where the presentation of media content continues using segments of the A version.

If a unique presentation is desired, at 612, content delivery network 102 determines a unique request ID. As discussed above, the unique request ID may have been determined in different ways. Then, at 614, content delivery network 102 determines a version for the segments in the media playlist. For example, the values of the unique request ID may correspond to either the A version or the B version, such as a value of "0" in the unique request ID may correspond to an A version and a value of "1" in the unique request D may correspond to the B version. For example, the unique request ID of "010000010011000101001110" results in the sequence of versions of "ABAA" for the first four segments corresponding to entropy slots, where A is a segment from the A version and B is a segment from the B version. Other segments are determined similarly. In contrast, a unique request ID of "011000010011000101001110" results in the sequence of "ABBA" for the first four segments corresponding to entropy slots. Other segments are determined similarly. As described above, content delivery network 102 may send multiple media playlists that include portions of the segments of the media content. If the segments that are being played back are not associated with entropy slots, then the media playlist may list information for segments that are from a fixed sequence of segments, such as segments from the A version. When entropy slots are encountered, content delivery network 102 may list a segment from the A version or the B version. At 616, content delivery network 102 sends the media playlist to client 104. Then, at 618, content delivery network 102 receives a request for the segment from client 104. As described above, the same methods may be used to request a segment using the link, but the request may be for a segment in the A version or the B version when entropy slots are encountered.

At 620, content delivery network 102 determines if the request is for the A version or the B version. In some embodiments, the link that is used to request the segment may be for the A version or the B version and content delivery network 102 retrieves the segment corresponding to the link and sends the segment to client 104. However, content delivery network 102 may use other methods to determine whether the A version or the B version is needed. At 622, if the A version has been requested, content delivery network 102 sends a segment using the A version. If the B version is requested, at 624, content delivery network 102 sends a segment using the B version. This process continues from 614 to 616 where the presentation of media content continues using segments of the A version or the B version.

Although the versions for entropy slots may be assigned using the unique request ID, the unique presentation may be determined in different ways. For example, pre-defined sequences may be used, such as the first four segments for two pre-defined sequences are associated with the values of "1000" and "0100" in the unique request IDs. Then, a first request for a unique presentation may be assigned a sequence of "1000" for the first four segments that correspond to entropy slots; then, a second request may be assigned the sequence of "0100" for the first four segments that correspond to entropy slots. The process may be followed as requests for unique presentations are received. The use of pre-defined sequences may reduce the number of B segments that have to be retrieved from origin storage 118. For example, for the first X requests, if the number of B segments that are retrieved may be limited to the first five segments of the 24 segments instead of from all 24 segments, less segments need to be retrieved from origin storage 118. Also, there may be a higher chance that a segment from the B version that is needed may be found in cache 402. However, this requires that some storage be used to determine which sequence was provided to a request. For example, when using a unique request ID that is generated using a predictable process that generated predictable outputs, the unique request ID may be determined based on known information, such as the user account identifier and content identifier. No information except for the user account identifier and the content identifier may need to be stored to determine the unique request ID. However, using pre-defined sequences, the sequence that is assigned to each request may need to be stored.

Figure 7:
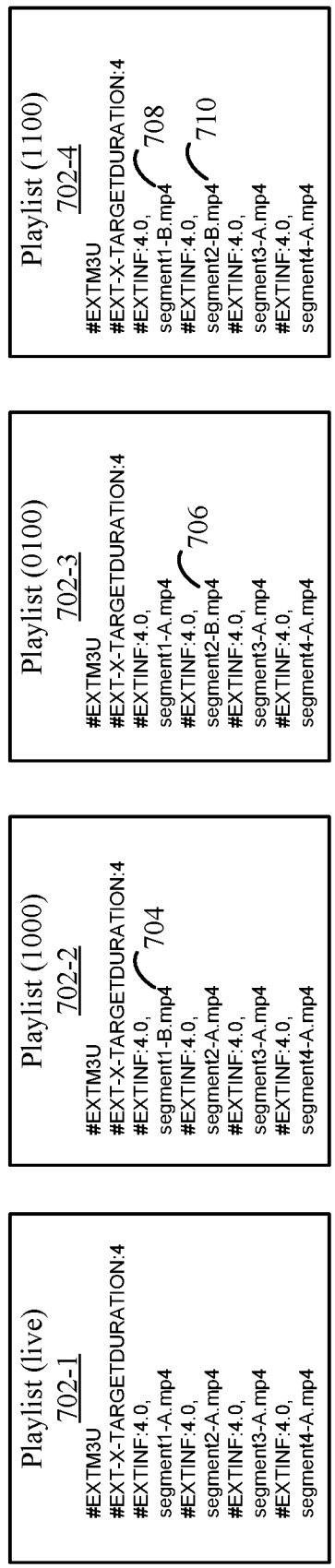
FIG. 7 shows an example of different media playlists according to some embodiments.

As described above, the media playlist may be different for unique presentations of the media content. FIG. 7 shows an example of different media playlists according to some embodiments. A first playlist 702 may be a playlist for a non-unique presentation, such as when the live version is played. Playlists 702-2, 702-3, and 702-4 may be media playlists for unique presentations.

For media playlist 702-1, the segments are from the A version because segment 1, segment 2, segment 3, and segment 4 have the extension of "-A" in the links. For example, the first segment is "Segment 1-A.mp4", the second segment is "Segment 2-A.mp4", and so on.

Playlist 702-2 may be associated with the unique request ID of "1000", which indicates the first segment should be from the B version and the second, third, and fourth segments should be from the A version. At 704, the segment "Segment 1-B.mp4" is from the B version of media content. Segments 2, 3 and 4 are from the A version.

In playlist 702-3, the unique request ID is "0100". In this case, at 706, the second segment "Segment 2-B.mp4" is from the B version. Segments 1, 3 and 4 are from the A version. In playlist 702-4, the unique request ID is "1100". In this case, the first two segments "Segment 1-B.mp4" and "Segment 2-B.mp4" at 708 and 710, respectively, are from the B version. Segments 3 and 4 are from the A version.

Dynamic Entropy Slot Generation

Figure 8:
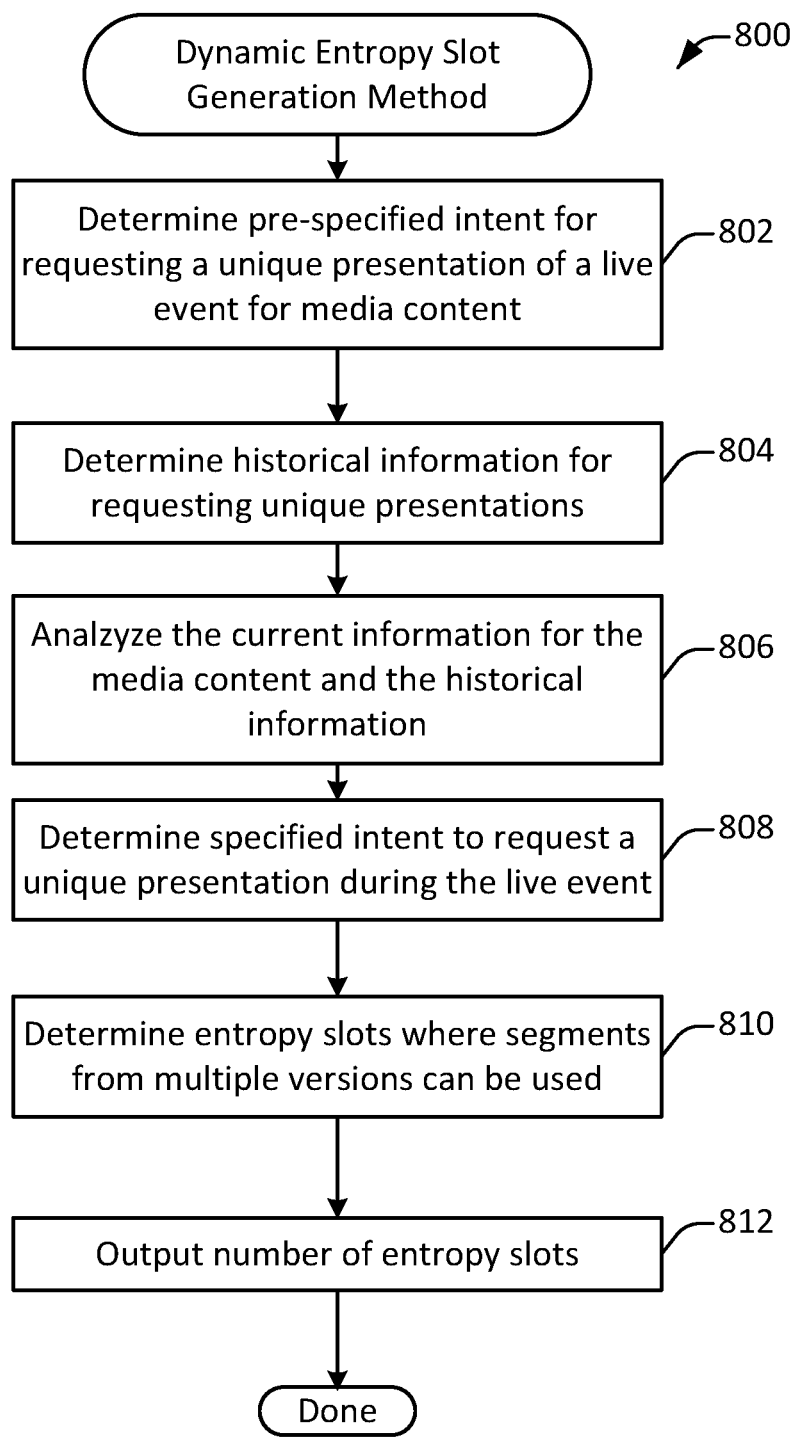
FIG. 8 depicts a simplified flowchart of a method for dynamically determining entropy slots for media content according to some embodiments.

FIG. 8 depicts a simplified flowchart 800 of a method for dynamically determining entropy slots for media content according to some embodiments. At 802, video delivery system 106 determines a pre-specified intent for requesting a unique presentation, such as an intent to record a copy of a live event for media content. A pre-specified intent may be an input from a user account to request a unique presentation before the live event occurs. For example, if a digital video recorder is being used, then the pre-specified intent may be an intent to record the live event at a future time. For example, some user accounts may record every episode of a show that airs every Thursday.

Video delivery system 106 may also determine a prediction for possible requests during the live event that may result in delivering a unique presentation. For example, during a live event, video delivery system 106 may receive a request to record the media content. That is, a user account may decide to record the media content while watching it. Video delivery system 106 may predict how many requests to record the media content may be received during the live event. Video delivery system 106 may perform the prediction in different ways. For example, video delivery system 106 may generate a prediction based on historical information. In some examples, video delivery system 106 may determine that similar media content has received X number of recording requests while the live event is played, and predict the number for the current media content. Other methods may also be used, such as using a prediction network that can receive an input of characteristics of the media content, and output the number of requests.

In some examples of predicting the specified intent, at 804, video delivery system 106 determines historical information for requesting unique presentations. The historical information may be based on how many unique presentations are requested for similar media content. At 806, video delivery system 106 may analyze current information for the media content and the historical information. For example, the current information may be how many pre-specified requests for media content have been submitted or a prediction of popularity for the media content. Then, at 808, video delivery system 106 determines the prediction for the specified intent to request a unique presentation during the live event.

At 810, video delivery system 106 determines entropy slots where segments from multiple versions can be used. For example, if the pre-specified intent and the specified intent indicate that X number of unique presentations are required, then a number of entropy slots is based on the X number of unique presentations. For example, if around 2000 unique presentations may be requested, then video delivery system 106 may select 12 entropy slots, which provides 4,096 possible unique presentations. However, if 15,000 unique presentations may be required, video delivery system 106 may select 24 entropy slots, which provides 16,777,216 possible unique presentations. Different methods for determining the number of entropy slots may be used, such as including a set buffer above the required number.

At 812, video delivery system 106 outputs the entropy slots to an encoder to encode segments of the version. The output may include a number of entropy slots and the position of the entropy slots. The position may be set to be at the end of the media content. The encoder may then encode the segments of the B version based on the entropy slots. For example, if the last 24 segments are entropy slots, the encoder encodes the last 24 segments of the live event as the B version.

Accordingly, unique presentations of media content may be provided in an improved manner. For example, a reduced amount of storage and computing resources may be used while providing better user experience while viewing the media content. Also, the streaming experience may be improved by the placement of entropy slots to increase the chance of segments being found within cache.

System

Figure 9:
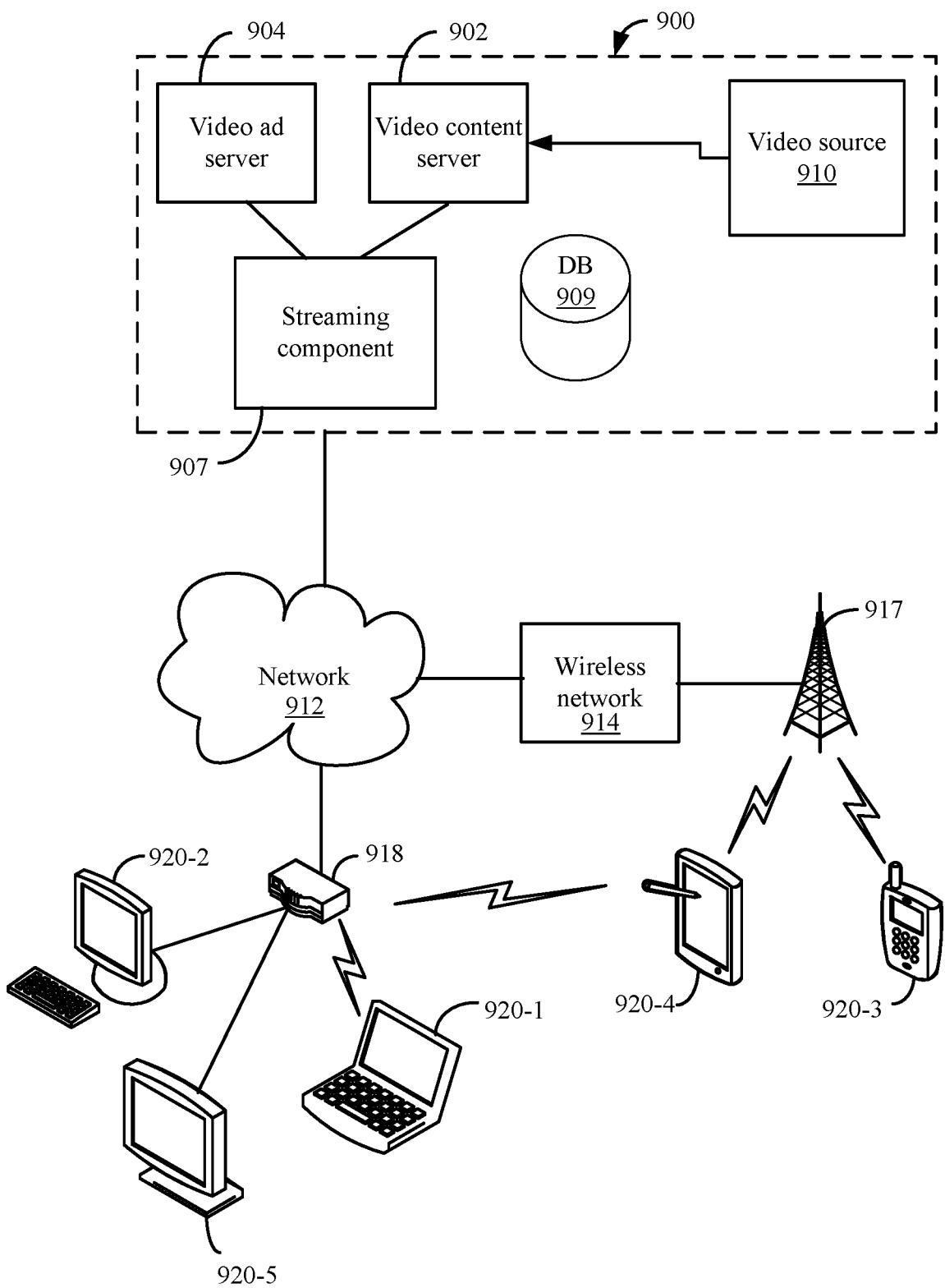
FIG. 9 depicts a video streaming system in communication with multiple client devices via one or more communication networks according to one embodiment.

Features and aspects as disclosed herein may be implemented in conjunction with a video streaming system 900 in communication with multiple client devices via one or more communication networks as shown in FIG. 9. Aspects of the video streaming system 900 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 900, video data may be obtained from one or more sources for example, from a video source 910, for use as input to a video content server 902. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner or transcoder. The input video data may comprise video clips or programs of various types, for example, television episodes, motion pictures, and other content produced as primary content of interest to consumers. The video data may also include audio or only audio may be used.

The video streaming system 900 may include one or more computer servers or modules 902, 904, and 907 distributed over one or more computers. Each server 902, 904, 907 may include, or may be operatively coupled to, one or more data stores 909, for example databases, indexes, files, or other data structures. A video content server 902 may access a data store (not shown) of various video segments. The video content server 902 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 904 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 900, a public service message, or some other information. The video advertising server 904 may serve the video advertising segments as directed by a user interface controller (not shown).

The video streaming system 900 may further include an integration and streaming component 907 that integrates video content and video advertising into a streaming video segment. For example, streaming component 907 may be a content server or streaming media server. A controller (not shown) may determine the selection or configuration of advertising in the streaming video based on any suitable algorithm or process. The video streaming system 900 may include other modules or units not depicted in FIG. 9, for example, administrative servers, commerce servers, network infrastructure, advertising selection engines, and so forth.

The video streaming system 900 may connect to a data communication network 912. A data communication network 912 may comprise a local area network (LAN), a wide area network (WAN), for example, the Internet, a telephone network, a wireless network 914 (e.g., a wireless cellular telecommunications network (WCS)), or some combination of these or similar networks.

One or more client devices 920 may be in communication with the video streaming system 900, via the data communication network 912, wireless network 914, or another network. Such client devices may include, for example, one or more laptop computers 920-1, desktop computers 920-2, "smart" mobile phones 920-3, tablet devices 920-4, network-enabled televisions 920-5, or combinations thereof, via a router 918 for a LAN, via a base station 917 for wireless network 914, or via some other connection. In operation, such client devices 920 may send and receive data or instructions to the system 900, in response to user input received from user input devices or other input. In response, the system 900 may serve video segments and metadata from the data store 909 responsive to selection of media programs to the client devices 920. Client devices 920 may output the video content from the streaming video segment in a media player using a display screen, projector, or other video output device, and receive user input for interacting with the video content.

Distribution of audio-video data may be implemented from streaming component 907 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 907 may communicate with client device 920 using control messages and data messages to adjust to changing network conditions as the video is played. These control messages can include commands for enabling control functions such as fast forward, fast reverse, pausing, or seeking to a particular part of the file at the client.

Since streaming component 907 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 907 may use TCP-based protocols, such as HyperText Transfer Protocol (HTTP) and Real Time Messaging Protocol (RTMP). Streaming component 907 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 10:
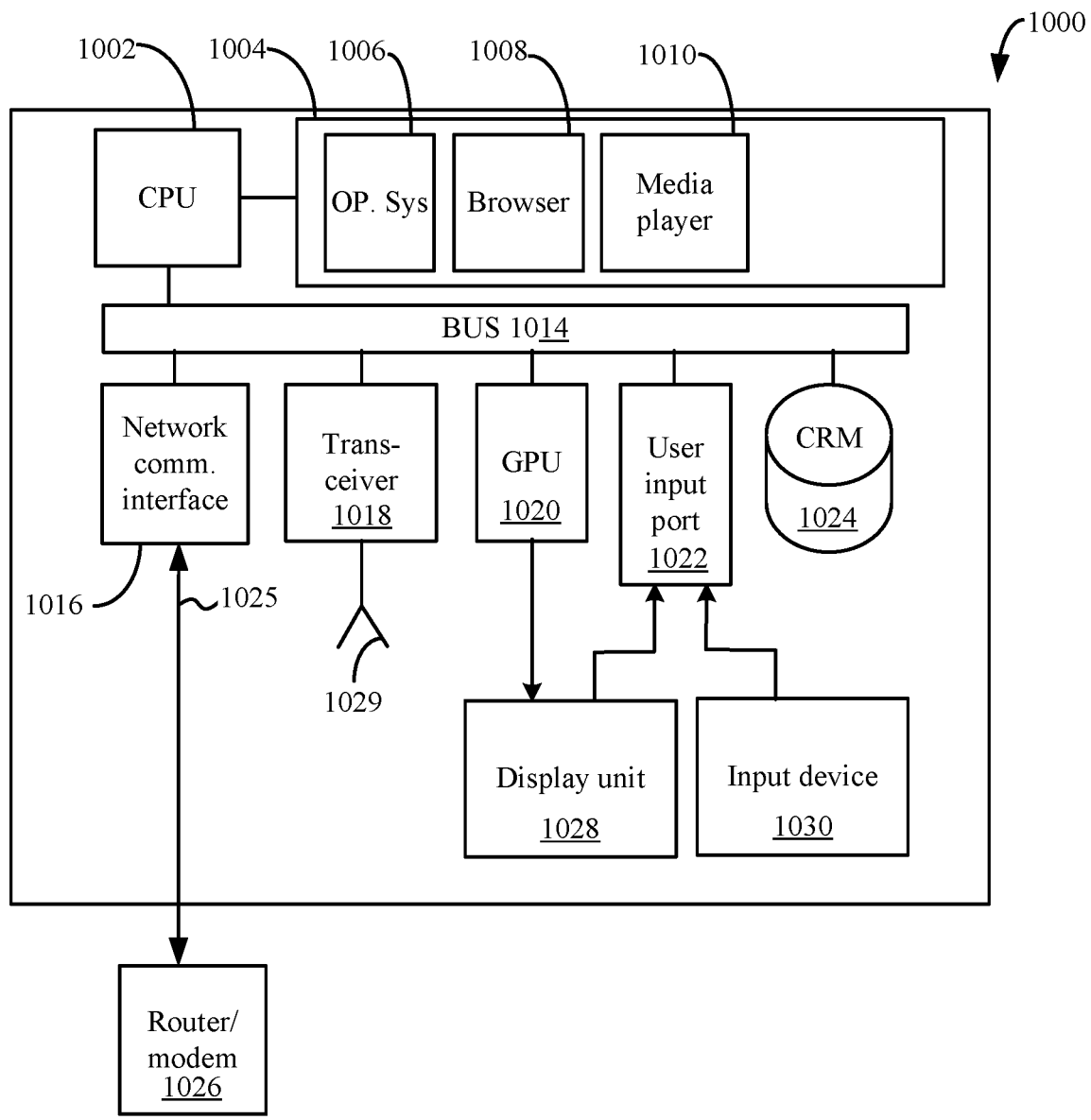
FIG. 10 depicts a diagrammatic view of an apparatus for viewing video content and advertisements.

Referring to FIG. 10, a diagrammatic view of an apparatus 1000 for viewing video content and advertisements is illustrated. In selected embodiments, the apparatus 1000 may include a processor (CPU) 1002 operatively coupled to a processor memory 1004, which holds binary-coded functional modules for execution by the processor 1002. Such functional modules may include an operating system 1006 for handling system functions such as input/output and memory access, a browser 1008 to display web pages, and media player 1010 for playing video. The memory 1004 may hold additional modules not shown in FIG. 10, for example modules for performing other operations described elsewhere herein.

A bus 1014 or other communication component may support communication of information within the apparatus 1000. The processor 1002 may be a specialized or dedicated microprocessor configured or operable to perform particular tasks in accordance with the features and aspects disclosed herein by executing machine-readable software code defining the particular tasks. Processor memory 1004 (e.g., random access memory (RAM) or other dynamic storage device) may be connected to the bus 1014 or directly to the processor 1002, and store information and instructions to be executed by a processor 1002. The memory 1004 may also store temporary variables or other intermediate information during execution of such instructions.

A computer-readable medium in a storage device 1024 may be connected to the bus 1014 and store static information and instructions for the processor 1002; for example, the storage device (CRM) 1024 may store the modules for operating system 1006, browser 1008, and media player 1010 when the apparatus 1000 is powered off, from which the modules may be loaded into the processor memory 1004 when the apparatus 1000 is powered up. The storage device 1024 may include a non-transitory computer-readable storage medium holding information, instructions, or some combination thereof, for example instructions that when executed by the processor 1002, cause the apparatus 1000 to be configured or operable to perform one or more operations of a method as described herein.

A network communication (comm.) interface 1016 may also be connected to the bus 1014. The network communication interface 1016 may provide or support two-way data communication between the apparatus 1000 and one or more external devices, e.g., the streaming system 900, optionally via a router/modem 1026 and a wired or wireless connection 1025. In the alternative, or in addition, the apparatus 1000 may include a transceiver 1018 connected to an antenna 1029, through which the apparatus 1000 may communicate wirelessly with a base station for a wireless communication system or with the router/modem 1026. In the alternative, the apparatus 1000 may communicate with a video streaming system 900 via a local area network, virtual private network, or other network. In another alternative, the apparatus 1000 may be incorporated as a module or component of the system 900 and communicate with other components via the bus 1014 or by some other modality.

The apparatus 1000 may be connected (e.g., via the bus 1014 and graphics processing unit 1020) to a display unit 1028. A display 1028 may include any suitable configuration for displaying information to an operator of the apparatus 1000. For example, a display 1028 may include or utilize a liquid crystal display (LCD), touchscreen LCD (e.g., capacitive display), light emitting diode (LED) display, projector, or other display device to present information to a user of the apparatus 1000 in a visual display.

One or more input devices 1030 (e.g., an alphanumeric keyboard, microphone, keypad, remote controller, game controller, camera, or camera array) may be connected to the bus 1014 via a user input port 1022 to communicate information and commands to the apparatus 1000. In selected embodiments, an input device 1030 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1028, for example using a touch sensitive screen. A cursor control device may communicate direction information and command selections to the processor 1002 and control cursor movement on the display 1028. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
   determining an intent for requesting an instance of media content, wherein the intent is used to determine a number of unique presentations for the instance of content that are required and wherein the unique presentations are created by unique sequences of segments from a first version of the instance of media content and a second version of the instance of media content;
   determining a number of entropy slots in the instance of media content based on the number of unique presentations, wherein the number of entropy slots in the instance of media content corresponds to first segments where unique sequences of segments from the first version of the instance of media content and the second version of the instance of media content can be delivered, and wherein second segments in the instance of media content are not entropy slots and do not vary the first version of the instance of media content or the second version of the instance of media content across unique presentations;
   determining the second version of the instance of media content having a different version of segments from the first version of the instance of media content in the first segments that correspond to the number of entropy slots; and
   outputting the second version of the instance of media content.

2. The method of claim 1, wherein the intent is a pre-specified intent of a number of requests that are received before a time.

3. The method of claim 2, wherein the time is based on a live event for the instance of media content.

4. The method of claim 1, wherein the intent is based on an input to record the instance of media content.

5. The method of claim 1, wherein determining the intent comprises:
   predicting a number of requests for the instance of media content.

6. The method of claim 5, wherein the number of requests includes a first portion of requests that will be received during playback of the instance of media content.

7. The method of claim 6, wherein predicting the number of requests comprises:
   determining historical information regarding use of a video delivery system; and
   predicting the first portion of requests that will be received based on the historical information.

8. The method of claim 7, wherein predicting the number of requests comprises:
   determining current information for the instance of media content; and
   predicting the first portion of requests that will be received based on the historical information and the current information.

9. The method of claim 8, wherein the current information comprises a second portion of requests that were pre-specified for the instance of media content, wherein the second portion of requests are received before a time.

10. The method of claim 1, wherein determining the number of entropy slots comprises:
    calculating the number of entropy slots based on a number of unique sequences of segments of the instance of media content that are possible using the number of entropy slots, wherein the number of unique sequences of segments is greater than a number of requests for the instance of content that is determined from the intent.

11. The method of claim 10, wherein number of entropy slots is calculated such that the number of unique sequences of segments is at least a set buffer greater than the number of unique sequences of segments.

12. The method of claim 11, wherein the first segments are from the first version of the instance of media content and a second version of the instance of media content in the entropy slots, and the second segments are from the first version of the instance of media content and not the second version of the instance of media content.

13. The method of claim 1, further comprising:
    encoding the second version of the instance of media content based on the number of entropy slots.

14. The method of claim 13, wherein encoding the second version of the instance of media content comprises:
    determining positions for the number of entropy slots; and
    encoding segments of the second version of the instance of media content in the positions.

15. The method of claim 14, wherein:
    segments not in the positions are not encoded for the second version of the instance of media content, and all the segments of the first version of the instance of media content are encoded.

16. The method of claim 14, wherein the positions are at an end of the second version of the instance of media content.

17. The method of claim 1, further comprising:
causing delivery of at least a portion of a unique sequence of segments of the media content for a request for the instance of media content, wherein the unique sequence of segments includes segments from the first version of the instance of media content and the second version of the instance of media content.

18. The method of claim 1, wherein the intent is based on a selection instruction to obtain a recording of the media content for later delivery by one or more user accounts.

19. A non-transitory computer-readable storage medium having stored thereon computer executable instructions, which when executed by a computing device, cause the computing device to be operable for:
determining an intent for requesting an instance of media content, wherein the intent is used to determine a number of unique presentations for the instance of content that are required, and wherein the unique presentations are created by unique sequences of segments from a first version of the instance of media content and a second version of the instance of media content;
determining a number of entropy slots in the instance of media content based on the number of unique presentations, wherein the number of entropy slots in the instance of media content corresponds to first segments where unique sequences of segments from the first version of the instance of media content and the second version of the instance of media content can be delivered, and wherein second segments in the instance of media content are not entropy slots and do not vary the first version of the instance of media content or the second version of the instance of media content across unique presentations;
determining the second version of the instance of media content having a different version of segments from the first version of the instance of media content in the first segments that correspond to the number of entropy slots; and
outputting the second version of the instance of media content.

20. An apparatus comprising:
one or more computer processors; and
a computer-readable storage medium comprising instructions for controlling the one or more computer processors to be operable for:
determining an intent for requesting an instance of media content, wherein the intent is used to determine a number of unique presentations for the instance of content that are required, and wherein the unique presentations are created by unique sequences of segments from a first version of the instance of media content and a second version of the instance of media content;
determining a number of entropy slots in the instance of media content based on the number of unique presentations, wherein the number of entropy slots in the instance of media content corresponds to first segments where unique sequences of segments from the first version of the instance of media content and the second version of the instance of media content can be delivered, and wherein second segments in the instance of media content are not entropy slots do not vary the first version of the instance of media content or the second version of the instance of media content across unique presentations;
determining the second version of the instance of media content having a different version of segments from the first version of the instance of media content in the first segments that correspond to the number of entropy slots; and
outputting the second version of the instance of media content.

* * * * *